United States Patent [19]
Shachi et al.

[11] Patent Number: 5,934,503
[45] Date of Patent: *Aug. 10, 1999

[54] CLOSURE AND SEALING ELEMENT

[75] Inventors: Kenji Shachi; Kazushige Ishiura; Hiroshi Hayashihara, all of Tsukuba, Japan

[73] Assignee: Kuraray Co., Ltd., Kurashiki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/684,142

[22] Filed: Jul. 19, 1996

[30] Foreign Application Priority Data

Jul. 20, 1995 [JP] Japan .................................. 7-206671

[51] Int. Cl.$^6$ .................................................. B65G 59/00
[52] U.S. Cl. .............................. 221/154; 525/95; 525/240
[58] Field of Search ...................... 525/95, 240; 221/154

[56] References Cited

U.S. PATENT DOCUMENTS

| | | | |
|---|---|---|---|
| 4,415,096 | 11/1983 | Ohmi ........................ | 215/343 |
| 4,503,123 | 3/1985 | Ou-Yang .................... | 428/349 |
| 4,833,206 | 5/1989 | Tajima ...................... | 525/187 |
| 4,872,573 | 10/1989 | Johnson et al. ............. | 215/347 |
| 4,940,158 | 7/1990 | Farrell et al. .............. | 220/258 |
| 5,486,558 | 1/1996 | Lee et al. .................. | 524/523 |

FOREIGN PATENT DOCUMENTS

| | | |
|---|---|---|
| 0 572 667 | 12/1993 | European Pat. Off. . |
| 5-212104 | 8/1993 | Japan . |
| 5-295053 | 11/1993 | Japan . |
| 07118492 | 5/1995 | Japan . |

OTHER PUBLICATIONS

Patent Abstracts of Japan, vol. 006, No. 131, Jul. 17, 1982, JP–A–57 055980, Apr. 3, 1982.
Patent Abstracts of Japan, vol. 11, No. 346, Nov. 12, 1987, JP–A–62 126570, Jun. 8, 1987.
Patent Abstracts of Japan, vol. 005, No. 071, May 13, 1981, JP–A– 56 020038, Feb. 25, 1981.
Patent Abstracts of Japan, vol. 013, No. 262, Jun. 16, 1989, JP–A–01 065149, Mar. 10, 1989.
Database WPI, Derwent Publications, AN–93–392713, JP–A–05 295 053, Nov. 9, 1993.
Database WPI, Derwent Publications, AN–93–298952, JP–A–05 212 104, Aug. 24, 1993.
Chemical Abstracts, vol. 123, No. 24, Dec. 11, 1995, AN–315802, Kenji Shachi, et al., "Polymer Compositions with Fluidity and Moldability and Moldings and Packing Materials Thereof", and JP–A–07 188 509, Jul. 25, 1995.

*Primary Examiner*—Randy Gulakowski
*Attorney, Agent, or Firm*—Oblon, Spivak, McClelland, Maier & Neustadt, P.C.

[57] ABSTRACT

A closure or sealing element for containers, comprising a resin composition principally composed of a polyolefin resin (A) and a block copolymer (B) of a polymer block of an aromatic vinyl compound and an isobutylenic polymer block at a (A)/(B) weigh ratio within a range of 100/5 to 100/100, has so suitable pliability and excellent thermal resistance, good gas barrier properties and great oil resistance, that the closure or sealing element has good mountability onto (into) containers and excellent sealing properties of the containers in addition to good long-term shelf stability of the contents.

12 Claims, No Drawings

CLOSURE AND SEALING ELEMENT

BACKGROUND OF THE INVENTION

1. Field of the Invention

The present invention relates to a closure for containers and a sealing element for the closure.

The closure and sealing element in accordance with the present invention have suitable pliability derived from their molding materials; and furthermore, they have excellent thermal resistance, superior gas barrier properties and good oil resistance. Therefore, the closure and sealing element have such good mountability onto (or within) containers and such excellent sealing properties of the containers that the closure and sealing element procure long-term shelf stability.

2. Related Art of the Invention

As conventional molding materials for producing closures for containers (for example, caps, stoppers and the like) and sealing elements (packing elements) for the closures, generally, use has been made of resins with suitable pliability, such as vinyl chloride resins and low-density polyethylenes. As the molding materials, furthermore, use has been made of resin compositions with pliability provided by blending an elastomer or a softening agent to polyolefin resins such as high-density polyethylenes and polypropylene.

Alternatively, Japanese Patent Application Laid-open No. Hei 5-295053 describes that a composition for a sealing material, comprising 100 parts by weight of a block copolymer containing a polymer block of an aromatic vinyl compound and an isobutylenic polymer block and 0 to 80 parts by weight of other blending agents, has greater degrees of gas barrier properties and pliability derived from the block copolymer and that the composition is used for example as a lid member for sealing bottles.

Furthermore, Japanese Patent Application Laid-open No. Hei 5-212104 proposes to produce sealing articles for medicinal and medical products using a block copolymer containing a polymer block of an aromatic vinyl compound and an isobutylenic polymer block. These sealing materials have been produced from rubber materials, conventionally, which are illustrated for example as rubber stoppers for pharmaceutical agents, rubber stoppers for blood sampling tubes, and syringe caps working also as containers for filling pharmaceutical solutions. The Japanese Patent Application Laid-open No. Hei 5-212104 describes that the medicinal and medical sealing articles produced by using the block copolymer are excellent in terms of pliability, gas barrier properties, non-solubilizability and the like and that a thermoplastic polymer such as a block copolymer of ethylene and propylene may possibly be mixed with the block copolymer.

However, the closures and sealing elements comprising vinyl chloride resins may potentially contaminate the contents due to the bleed out of the remaining monomers and plasticizers under some conditions of the contents and the environment for use. Because the closures and the like comprising low-density polyethylenes have poor thermal resistance and gas barrier properties, they may possibly be deteriorated through the thermal treatment after filling and sealing. Additionally, they have poor long-term shelf stability. The closures and the like comprising a resin composition of a polyolefin resin blended with a softening agent may potentially contaminate the contents due to the bleed out of the softening agent under some conditions of the contents, the environment for use and the like. Still furthermore, the gas barrier properties of the closures and the like comprising a resin composition of the polyolefin resin blended with an elastomer are in general distinctively decreased due to the blending of the elastomer. Therefore, such closures and the like do not have good long-term shelf stability. Additionally, the blending of an elastomer alone cannot often provide satisfactory pliability. In such case, a softening agent should be used in combination, involving the contamination problem described above.

Alternatively, a sealing material comprising as a principal component a block copolymer containing a polymer block of an aromatic vinyl compound and an isobutylenic polymer block, as is described in Japanese Patent Application Laid-open Nos. Hei 5-295053 and Hei 5-212104, has higher pliability together with excellent gas barrier properties. The present inventors have made attempts to mold a closure and a sealing element for the closure by using the sealing material to seal a container by using them. However, it has been found that when mounting a threaded cap integrally molded from the sealing material onto a container, the slide of the cap in contact with the container is so poor because of too high pliability of the cap that excess strength is needed for the mounting thereof. Furthermore, it has been found that when a threaded cap mounted with a packing element molded from the sealing material is to be mounted onto a container, the slide of the cap on contact to the container is so poor because of too high pliability of the packing element that the back motion readily occurs, whereby complete sealing is not readily achieved. Furthermore, the oil resistance of the sealing material is not so high. Based on these findings, the inventors have found that the closure and sealing element comprising a material principally comprising the block copolymer are applicable in a narrow range of fields in a practical sense and that the closure and sealing element are only used for specific applications.

SUMMARY OF THE INVENTION

It is an objective of the present invention to provide a closure for containers (specifically, a closure secured by rotation via a screw and the like), wherein at least the sealing element thereof is provided with suitable pliability and excellent thermal resistance, good gas barrier properties and high oil resistance without any component with bleed-out potential.

It is also an objective of the present invention to provide a sealing element for a closure for containers, having suitable pliability and excellent thermal resistance, good gas barrier properties and high oil resistance without any component with bleed-out potential.

In accordance with the present invention, the first objective described above can be achieved by providing a closure for containers, wherein at least the sealing element thereof comprises a resin composition principally composed of (A) 100 parts by weight of a polyolefin resin and (B) 5 to 100 parts by weight of a block copolymer containing a polymer block of an aromatic vinyl compound and an isobutylenic polymer block.

In accordance with the present invention, the other objective described above can be achieved by providing a sealing element comprising a resin composition principally composed of (A) 100 parts by weight of a polyolefin resin and (B) 5 to 100 parts by weight of a block copolymer containing a polymer block of an aromatic vinyl compound and an isobutylenic polymer block.

DETAILED DESCRIPTION OF THE INVENTION

The present invention will be described in detail hereinbelow.

The polyolefin resin to be used as the component (A) in accordance with the present invention includes a polymer of a single olefin monomer such as high-density polyethylene, low-density polyethylene and polypropylene; a copolymer of two or more monomers, such as ethylene-propylene random copolymer, ethylene-propylene block copolymer, ethylene-1-butene copolymer, ethylene-1-hexene copolymer, and ethylene-1-octene copolymer. Herein, the polyolefin resin (A) is not limited to any single polyolefin resin; depending on the use, two or more polyolefin resins may be used in combination satisfactorily.

The block copolymer to be used as the component (B) in accordance with the present invention should contain (a) a polymer block of an aromatic vinyl compound and (b) an isobutylenic polymer block.

The block (a) is a polymer block derived from a monomer principally comprising an aromatic vinyl compound. As the aromatic vinyl compound, use may be made of styrene, p-methylstyrene, a-methylstyrene and the like, singly or in combination of two or more thereof. The block (a) may preferably have a number average molecular weight within a range of 3,000 to 80,000.

Alternatively, the block (b) is a polymer block derived from a monomer principally comprising isobutylene. For the improvement of the melt flowability of the block copolymer (B) whereby the block copolymer (B) can readily be mixed with the polyolefin resin (A) to facilitate the subsequent molding of the resulting mixture, the number average molecular weight of the block (b) is preferably within a range of 20,000 to 200,000; the total weight of the block (a) in the block copolymer (B) is preferably within a range of 10 to 60% to the total weight of the blocks (a) and (b) in the block copolymer (B).

As the block copolymer (B), use may be made of two or more block copolymers, depending on the use, with no specific limitation to the use of a single block copolymer.

As the method for producing the block copolymer (B), a method may be employed, comprising sequentially polymerizing a monomer principally comprising an aromatic vinyl compound and a monomer principally comprising isobutylene in an inactive solvent such as hexane and methylene chloride in the presence of an initiator system comprising a Lewis acid and an organic compound capable of forming a cation-polymerizable active species in combination with the Lewis acid. Herein, the Lewis acid includes for example titanium tetrachloride, boron trichloride, aluminum chloride and stannic tetrachloride. The organic compound capable of forming a cation-polymerizable active species means an organic compound having a functional group such as an alkoxy group, an acyloxy group, and a halogen atom, for example including bis(2-methoxy-2-propyl)benzene, bis(2-acetoxy-2-propyl)benzene, bis(2-chloro-2-propyl)benzene and the like. If necessary, pyridine and amides such as dimethylacetamide and dimethylformamide may be added to the polymerization reaction system in accordance with the polymerization method described above. According to the polymerization method, the triblock copolymer of block (a)-block (b)-block (a), may be produced for example by polymerizing a monomer principally comprising isobutylene by using an initiator system comprising a Lewis acid and an organic compound having two functional groups, and adding a monomer principally comprising an aromatic vinyl compound to the polymerization reaction system when the polymerization reaction is substantially completed, whereby the polymerization reaction can be continued sequentially.

In accordance with the present invention, the resin composition contains the polyolefin resin (A) and the block copolymer (B) as the principal structural components at a mixing ratio as the (A)/(B) weight ratio within a range of 100/5 to 100/100.

If the block copolymer (B) is at less than 5 parts by weight to, 100 parts by weight of the polyolefin resin (A), the pliability of the resulting resin composition is not sufficient, so that a closure or sealing element made of the resin composition has only degraded sealing properties for containers.

If the block copolymer (B) is above 100 parts by weight to 100 parts by weight of the polyolefin resin (A), the pliability of the resin composition is too high. When such resin composition containing an excess of the block copolymer (B) is prepared as a closure secured by rotation via a screw and the like, therefore, the slide thereof in contact to a container is so deteriorated that it will be difficult to mount the closure onto the container via rotation. When a sealing element molded from the resin composition is mounted within a closure secured by rotation for use, complete sealing will be difficult, disadvantageously, which is illustrated by the occurrence of the back motion when a screw locks into the opening of a container. Because a resin composition containing an excess of the block copolymer (B) has lower oil resistance, furthermore, the range of the composition applicable as a closure or sealing element is limited.

So as to overcome the above problems of the closure or sealing element made of the resin composition and so that the closure or sealing element might have suitable pliability with both of good mountability on (in) a container and excellent sealing properties of the container together with excellent oil resistance, preferably, the mixing ratio of the polyolefin resin (A) and the block copolymer (B) as the (A)/(B) weight ratio is within a range of 100/20 to 100/100.

In accordance with the present invention, additionally, another component may be blended with the resin composition for the closure and sealing element, if necessary, other than the polyolefin resin (A) and the block copolymer (B), without departing from the advantages of the present invention. For the purpose of improving the heat resistance and weatherability or filling, for example, an inorganic filler may be blended, including calcium carbonate, talc, carbon black, titanium oxide, silica, clay, barium sulfate, magnesium carbonate and the like. So as to further improve the sliding properties of a molded closure or sealing element, a lubricant may be added, such as aliphatic hydrocarbon lubricants for example polyolefin wax, higher aliphatic alcohols, higher fatty acid lubricants, fatty acid amide lubricants for example amides or bisamides of higher fatty acids, and metal soap lubricants such as calcium stearate. Besides, a thermal stabilizer, an antioxidant, a photo-stabilizer and the like may be blended as well.

Any mixing method may be used, with no specific limitation, for mixing individual components of the resin composition in accordance with the present invention; and the same method as for the production of general polyolefin resin compositions may be adopted. A desired resin composition may be produced for example by mixing together the polyolefin resin (A) and the block copolymer (B) at their melt state by means of a melt kneader such as extruder and kneader. When mixing is carried out at such melt state, heating should be done above a temperature at which the individual components are melt and fluidized and within a temperature range with no occurrence of thermal deterioration; the temperature is generally within a range of 150 to 300° C., more preferably within a range of 180 to 280° C.

According to a known method, the aforementioned resin composition can be molded into a closure or sealing element of a desirable shape and dimension. For example, a closure integral to a sealing element may be produced by injection molding of the resin composition into a given shape. A sealing element independent of the body of a closure may be produced according to a method comprising punching a sheet or film produced by a molding or forming method such as extrusion, by means of a blanking die and the like. The sealing element thus produced can be mounted onto the body of a closure by a method such as thermal fusing, for subsequent use. The sealing element of the present invention may also be produced by melt extruding and press molding the resin composition onto the body of a closure comprising a different type of a material (for example, metal).

At least the sealing element of the closure of the present invention comprises the resin composition; the closure includes not only an integrally molded article of the resin composition but also a closure with a sealing element comprising the resin composition as a structural member thereof. The closure of the present invention includes a variety of shapes such as cap and stopper. The suitable pliability of the resin composition is effectively exerted particularly in those secured by rotation via a screw and the like. The sealing element (packing element) of the present invention includes a variety of shapes such as disk and ring.

The closure and sealing element of the present invention have suitable pliability derived from the use of the polyolefin resin composition containing a specific ratio of a specific block copolymer as the molding material; because of their excellent thermal resistance, superior gas barrier properties and good oil resistance, furthermore, the closure and sealing element of the present invention are provided with good mountability onto (into) a container and excellent sealing properties of the container, leading to good long-term shelf stability of the contents.

The present invention will be described in detail in examples, but the invention is not limited to these examples. The term "part(s)" means "part(s) by weight" in individual examples. The properties of the resin compositions from the following Reference Examples were assessed according to the methods (1) to (4) described below.

1. Evaluation of pliability

A resin composition was press molded under the condition of a temperature higher by 20° C. than the melting temperature, to prepare a sheet of a thickness of 6 mm. The hardness (Shore D) of the sheet was measured according to JIS K7215, which was then designated as a pliability indicator.

2. Thermal resistance of molded article A resin composition was press molded to prepare a sample piece of a sheet form of a 20-cm length × a 20-cm width × a 2-mm thickness. The sample piece was left to stand in an air oven at a temperature of 150° C. for 24 hours, and was then cooled to room temperature to touch the resulting sample by finger to assess the sticky feeling on the sample surface.

The extent of thermal deterioration was assessed and ranked at the following four grades;
(a) excellent; no sticking as was observed before heating;
(b) normal; almost no sticking;
(c) slightly poor; slightly sticky; and
(d) poor; very sticky.

3. Gas barrier properties

A resin composition was press molded under the condition of higher temperatures by 20° C. than the melting temperature, to prepare film of a thickness of 200 μm. The oxygen permeability coefficient, namely $Po_2$, of the film was measured under the conditions of a 2.5 kg/cm² oxygen pressure and a temperature of 35° C. by using a gas permeability analyzer (Type GTR-10, manufactured by Yanagimoto Mfg. Co., Ltd.). The coefficient was designated as an indicator of gas barrier properties.

4. Oil resistance

A resin composition was press molded under the condition of a temperature higher by 20° C. than the melt temperature, to prepare a disk sample piece of a 6-mm thickness and a 50-mm diameter. After immersing the sample piece in a vegetable oil for 7 days, the piece was drawn out to judge the presence or absence of the change of the appearance. The oil resistance was evaluated and ranked at the following two grades; the resistance was judged as "good" when no change of the appearance was observed; and judged as "poor" when a roughened surface appeared.

The polyolefin resins used in the Reference Examples are represented by the following abbreviations. Polyolefin resin (A-1); high-density polyethylene (J-REX HD F6200V; manufactured by JAPAN POLYOLEFINS). Polyolefin resin (A-2); Propylene-ethylene block copolymer (Mitsubishi Polypropylene BC 3; manufactured by Mitsubishi Chemical Corporation).

The processes of producing block copolymers (B) used in the Reference Examples are described below.

SYNTHETIC EXAMPLE 1

Production of Block Copolymer (B-1)

Into a reactor with an agitator were charged 1060 parts of methylene chloride and 924 parts of methylcyclohexane, dehydrogenated and purified by means of Molecular Sieve 4A, followed by individual addition of 2.0 parts of 1,4-bis (2-chloro-2-propyl)benzene, 0.98 part of 2,6-dimethylpyridine, 1.38 parts of pyridine and 210 parts of isobutylene. To the resulting mixture were added 12.3 parts of titanium tetrachloride at −78° C. for initiating polymerization which was continued at the same temperature for 3 hours, followed by addition of 0.5 part of 2,6-dimethylpyridine and 90 parts of styrene for further polymerization for another 2 hours to recover a thermoplastic styrene-isobutylene-styrene triblock copolymer (B-1).

The number average molecular weight and molecular weight distribution (Mw/Mn) of the resulting block copolymer were 34,000 and 1.23, respectively, while the polystyrene block content was 30% by weight.

SYNTHETIC EXAMPLE 2

Production of Block Copolymer (B-2)

Into a reactor with an agitator were charged 1060 parts of methylene chloride and 924 parts of methylcyclohexane, dehydrogenated and purified by means of Molecular Sieve 4A, followed by individual addition of 1.0 part of 1,4-bis (2-chloro-2-propyl)benzene, 1.74 parts of 2,6-di-t-butylpyridine, 0.68 part of pyridine and 210 parts of isobutylene. To the resulting mixture were added 12.3 parts of titanium tetrachloride at −78° C. for initiating polymerization which was continued for 4 hours, folowed by addition of 0.90 part of 2,6-di-t-butylpyridine and 52.5 parts of styrene for further polymerization for another 4 hours to recover a thermoplastic styrene-isobutylene-styrene triblock copolymer (B-2).

The number average molecular weight and molecular weight distribution (Mw/Mn) of the resulting block copolymer were 75,000 and 1.20, respectively, while the polystyrene block content was 20% by weight.

REFERENCE EXAMPLES 1–6

At the ratios shown in Table 1, the polyolefin resin (A-1) or (A-2) was preliminarily mixed with the block copolymer (B-1) or (B-2). The resulting mixtures were kneaded under melting conditions by means of a twin-screw extruder to recover resin compositions.

The assessment results of the resulting resin compositions are shown in Table 1.

REFERENCE EXAMPLES 7–9

Resin compositions were prepared in the same manner as in the Reference Examples 1–6, except that use was made of other elastomers, instead of the block copolymer (B-1) or (B-2), at the ratios shown in Table 1. The elastomer used was styrene-ethylene propylene-styrene triblock copolymer (C-1) (the number average molecular weight of 45,000; the molecular weight distribution (Mw/Mn) of 1.13; the polystyrene block content of 20% by weight) or styrene-ethylene butylene-styrene triblock copolymer (C-2) (the number average molecular weight of 45,000; the molecular weight distribution (Mw/Mn) of 1.13; the polystyrene block content of 20% by weight). The assessment results of the resulting resin compositions are shown in Table 1.

REFERENCE EXAMPLE 10

The polyolefin resin (A-1) was assessed singly with no blending of any block copolymer. The assessment results are shown in Table 1.

from the respect that the weight ratio of the polyolefin resin (A)/block copolymer (B) is 80/100, namely 100/125. The resin compositions produced in the Reference Examples 7 to 9 are indicated to have unsatisfactory gas barrier properties with oxygen permeability coefficients of 50,000 cc.20 $\mu m/m^2$.day.atm or more, along with poor thermal resistance which was judged as "slightly poor" at the assessment of thermal deterioration, which compositions are different from the molding material providing the closure and sealing element of the present invention, from the respect of the use of other elastomers instead of the block copolymer (B). Furthermore, the resin composition produced in the Reference Example 9 has a higher Shore D hardness value of 60, which indicates that the composition has unsatisfactory pliability. The resin of the Reference Example 10 has a higher Shore D hardness value of 60 or more, which indicates that the resin has insufficient pliability, which resin is different from the molding material providing the closure and sealing element of the present invention from the respect of the single use of the polyolefin resin (A) with no use of the block copolymer (B).

EXAMPLE 1

By individually injection molding the resin compositions produced in the Reference Examples 1 to 5, threaded caps each of a 25-mm diameter and a 13-mm height were prepared.

When attempts were made to mount the resulting threaded caps onto threaded glass containers, the caps could be locked completely in all cases.

COMPARATIVE EXAMPLE 1

Threaded caps were prepared in the same manner as in Example 1, except for the use of the resin composition produced in the Reference Example 6.

TABLE 1

| | Reference Example No. | | | | | | | | | |
|---|---|---|---|---|---|---|---|---|---|---|
| | 1 | 2 | 3 | 4 | 5 | 6 | 7 | 8 | 9 | 10 |
| Polyolefin resin | A-1 | A-1 | A-1 | A-1 | A-2 | A-1 | A-1 | A-1 | A-2 | A-1 |
| (parts by weight) | 100 | 100 | 100 | 100 | 100 | 80 | 100 | 100 | 100 | 100 |
| Block copolymer | B-1 | B-2 | B-1 | B-2 | B-1 | B-1 | C-1 | C-2 | C-1 | — |
| (parts by weight) | 30 | 30 | 90 | 90 | 90 | 100 | 30 | 90 | 90 | 0 |
| Hardness (shore D) | 49 | 48 | 42 | 39 | 52 | 32 | 52 | 49 | 60 | 61 |
| Oxygen permeability coefficient (cc · 20 $\mu m/m^2$ · day · atm) | 5600 | 4700 | 5800 | 4900 | 5700 | 6500 | 55000 | 58000 | 59000 | 3500 |
| Thermal resistance (sticky feeing) | b | b | b | b | b | b | c | c | b | b |
| Oil resistance (change of appearance) | Good | Good | Good | Good | Good | Poor | Good | Good | Good | Good |

Table 1 shows that the resin compositions produced in the Reference Examples 1 to 5 have suitable pliability of about 35 to 55 as the Shore D hardness, excellent gas barrier properties of an oxygen permeability coefficient of less than 6,000 cc.20 $\mu m/m^2$.day.atm, good thermal resistance which was judged as "normal" at the assessment of thermal deterioration and good oil resistance which was judged as "good" at the assessment of oil resistance. The resin compositions fall under the molding material providing the closure and sealing element of the present invention. It is also indicated that the resin composition produced in the Reference Example 6 has too high pliability with the Shore D hardness of 32 and unsatisfactory oil resistance indicated from the "poor" assessment result of oil resistance, which composition is different from the molding material providing the closure and sealing element of the present invention When attempting to mount the resulting threaded cap onto a threaded glass container, no sufficient mounting could be procured because of the poor slide between the cap and the container.

EXAMPLE 2

By forming sheets each of a thickness of 0.5 mm from the resin compositions produced in the Reference Examples 1 to 5 by extrusion and punching the sheets into a disk shape, individually, disk-like sealing elements were prepared. Each of the resulting sealing elements was thermally fused onto the inside of the body of an aluminum threaded cap for adhesion. When attempts were made to mount the resulting threaded caps individually onto threaded glass containers, complete locking could be procured in any case.

COMPARATIVE EXAMPLE 2

Sealing elements were prepared and fixed on the body of the cap in the same manner as in Example 2, except for the use of the resin composition produced in the Reference Example 6.

When attempting to mount the resulting threaded cap onto a threaded glass container, no sufficient locking could be procured because of the occurrence of the back motion of the cap during locking.

EXAMPLE 3

By individually melt extruding the resin compositions produced in the Reference Examples 1 to 5 onto the inside of the body of an aluminum threaded cap and press molding the resulting compositions, caps were individually prepared. When mounting the resulting caps onto threaded glass containers, complete locking could be achieved in any case.

COMPARATIVE EXAMPLE 3

Threaded caps were prepared in the same manner as in Example 3, except for the use of the resin composition produced in the Reference Example 6.

When attempting to mount the resulting threaded cap onto a threaded glass container, no sufficient locking could be achieved because of the occurrence of the back motion of the cap during locking.

What is claimed is:

1. A combination of a container and a closure therefor, wherein at least the sealing element of the closure comprises a resin composition principally composed of a mixture of (A) 100 parts by weight of a polyolefin resin selected from the group consisting of high density polyethylene and propylene-ethylene block copolymer and (B) 30 to 90 parts by weight of a block copolymer containing a polymer block of an aromatic vinyl compound and an isobutylenic polymer block, wherein said resin composition has a Shore D hardness of 35 to 55 and an oxygen permeability coefficient of less than 6,000 cc.20 $\mu$m/m$^2$.day.atm.

2. The container and closure combination according to claim 1, wherein said closure is secured by rotation.

3. The container and closure combination according to claim 1, wherein said closure comprises an integrally molded article of the resin composition.

4. The container and closure combination according to claim 1, wherein said closure comprises a sealing element comprising the resin composition and a closure body comprising a different type of a material.

5. The container and closure combination according to claim 1, wherein said closure is a cap.

6. The container and closure combination according to claim 1, wherein said closure is a stopper.

7. A method comprising sealing a container with a closure containing a sealing element, wherein the sealing element comprises a resin composition principally composed of (A) 100 parts by weight of a polyolefin resin selected from the group consisting of high density polyethylene and propylene-ethylene block copolymer and (B) 30 to 90 parts by weight of a block copolymer containing a polymer block of an aromatic vinyl compound and an isobutylenic polymer block, wherein said resin composition has a Shore D hardness of 35 to 55 and an oxygen permeability coefficient of less than 6,000 cc.20 $\mu$m/m$^2$ day.atm.

8. The method according to claim 7, wherein said closure is secured by rotation.

9. The method according to claim 7, wherein said closure comprises an integrally molded article of the resin composition.

10. The method according to claim 7, wherein said closure comprises a sealing element comprising the resin composition and a closure body comprising a different type of a material.

11. The method according to claim 7, wherein said closure is a cap.

12. The method according to claim 7, wherein said closure is a stopper.

* * * * *